(12) United States Patent
Okuzono

(10) Patent No.: US 12,189,998 B2
(45) Date of Patent: Jan. 7, 2025

(54) RECORDING DEVICE CONFIGURED TO EXECUTE INITIAL INTRODUCTION INCLUDING SUPPLYING COLORING AGENT TO AN INKJET HEAD TO ENABLE RECORDING OPERATION, RECORDING SYSTEM AND CONTROL METHOD THEREFOR

(71) Applicant: BROTHER KOGYO KABUSHIKI KAISHA, Nagoya (JP)

(72) Inventor: Taisei Okuzono, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/359,333

(22) Filed: Jul. 26, 2023

(65) Prior Publication Data
US 2023/0367523 A1 Nov. 16, 2023

Related U.S. Application Data

(63) Continuation of application No. PCT/JP2021/033668, filed on Sep. 14, 2021.

(30) Foreign Application Priority Data

Jan. 28, 2021 (JP) .................................. 2021-012164

(51) Int. Cl.
*G06F 3/12* (2006.01)
(52) U.S. Cl.
CPC ............ *G06F 3/1205* (2013.01); *G06F 3/121* (2013.01); *G06F 3/1234* (2013.01);
(Continued)

(58) Field of Classification Search
None
See application file for complete search history.

(56) References Cited

U.S. PATENT DOCUMENTS

| 5,323,393 | A | 6/1994 | Barrett et al. |
| 7,207,475 | B2 * | 4/2007 | Tanaka .................... G06F 3/123 235/487 |

(Continued)

FOREIGN PATENT DOCUMENTS

| JP | S59104670 A | 6/1984 |
| JP | 2002137501 A | 5/2002 |

(Continued)

OTHER PUBLICATIONS

International Search Report dated Dec. 7, 2021 issued in PCT/JP2021/033668.

(Continued)

*Primary Examiner* — Scott A Rogers
(74) *Attorney, Agent, or Firm* — Scully, Scott, Murphy & Presser, P.C.

(57) ABSTRACT

A recording device performs an initial introduction process of executing initial introduction to enable a recording operation by a recording unit in an initial state where a recording operation by a recording unit is not enabled, a completion determining process of determining whether the initial introduction is normally completed, and a shifting process of shifting a state of the recording device from the initial state to a state where the recording operation by the recording unit is enabled within a permitted recording number of the recording operation by the recording unit in response to determining that the initial introduction is normally completed in the completion determining process.

14 Claims, 9 Drawing Sheets

Figure 1:
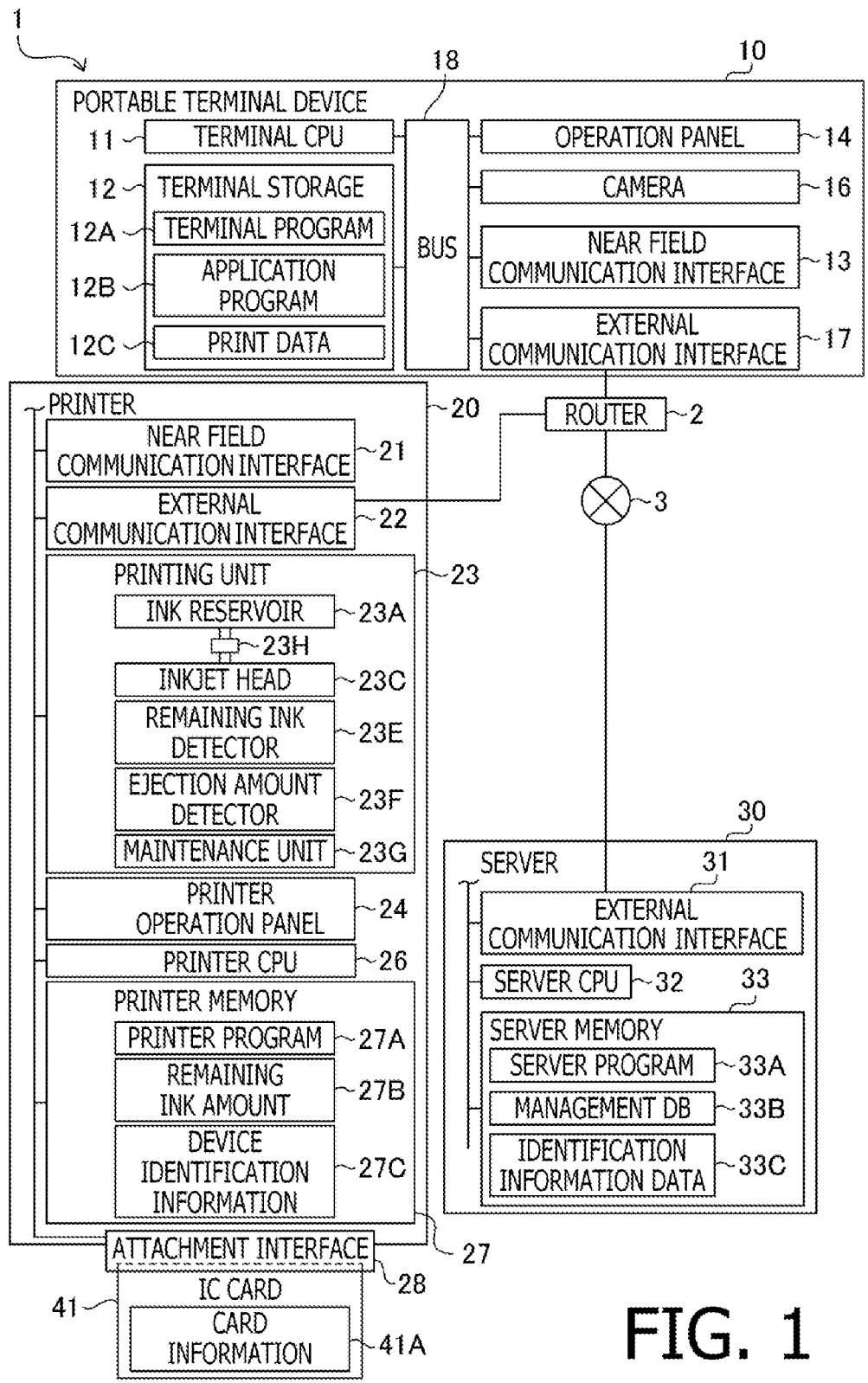

(52) U.S. Cl.
CPC ............ *G06F 3/1239* (2013.01); *G06F 3/128* (2013.01); *G06F 3/1288* (2013.01)

(56) References Cited

U.S. PATENT DOCUMENTS

| | | | | |
|---|---|---|---|---|
| 7,791,754 | B2* | 9/2010 | Takahashi | G06F 3/1204 358/1.9 |
| 8,312,527 | B2* | 11/2012 | Hashimoto | G06F 21/335 713/157 |
| 8,570,544 | B2* | 10/2013 | Jung | G06F 21/608 358/1.14 |
| 9,021,567 | B2* | 4/2015 | Kawai | H04L 63/083 726/7 |
| 9,766,847 | B1* | 9/2017 | Alacar | G06F 3/1224 |
| 10,223,043 | B2* | 3/2019 | Onomatsu | B41J 29/38 |
| 10,367,954 | B2* | 7/2019 | Tadachi | G06F 21/34 |
| 11,055,036 | B2* | 7/2021 | Kato | H04N 1/32555 |
| 11,687,295 | B2* | 6/2023 | Tamura | G06F 3/1219 358/1.14 |
| 11,836,401 | B2* | 12/2023 | Kawaguchi | B41J 29/38 |
| 2003/0110412 | A1* | 6/2003 | Neville | G03B 15/006 714/25 |
| 2004/0083147 | A1 | 4/2004 | Aoki | |
| 2006/0045595 | A1 | 3/2006 | Hanaoka | |
| 2007/0255918 | A1 | 11/2007 | Suzuki | |
| 2014/0118772 | A1 | 5/2014 | Lim | |
| 2018/0101336 | A1 | 4/2018 | Onomatsu | |
| 2023/0359404 | A1* | 11/2023 | Okuno | G06F 3/1226 |
| 2023/0359417 | A1* | 11/2023 | Kamiya | G06F 3/12 |
| 2024/0078062 | A1* | 3/2024 | Hirai | G06F 3/1239 |

FOREIGN PATENT DOCUMENTS

| | | |
|---|---|---|
| JP | 2003054000 A | 2/2003 |
| JP | 2004090517 A | 3/2004 |
| JP | 2004147053 A | 5/2004 |
| JP | 2005088534 A | 4/2005 |
| JP | 2006243903 A | 9/2006 |
| JP | 2007300329 A | 11/2007 |
| JP | 2012187930 A | 10/2012 |
| JP | 2018058312 A | 4/2018 |
| JP | 2021193487 A | 12/2021 |
| WO | 2017030571 A1 | 2/2017 |

OTHER PUBLICATIONS

International Preliminary Report on Patentability and Written Opinion from PCT/JP2021/033668 dated Jul. 31, 2023 together with English language translations.

Notice of Reasons for Refusal dated Oct. 15, 2024 from the Japanese Patent Office received in a corresponding foreign application, namely Japanese Patent Application No. 2021-012164, together with English language translation, 6 pages.

Supplementary European Search Report dated Nov. 18, 2024 received in a corresponding foreign application, namely European Patent Application No. 21923009.1, 13 pages.

\* cited by examiner

CARD INFORMATION 41A

| CARD ID | CID1 |
|---|---|
| PRINTABLE NUMBER OF SHEETS | pr1 |
| ACTIVATION INFORMATION | ○ |

FIG. 2

MANAGEMENT DB 33B

| DEVICE IDENTIFICATION INFORMATION | dv1 | dv2 | dv3 | ·· |
|---|---|---|---|---|
| CARD ID | CID1 | CID1 | CID2 | |
| ACTIVATION INFORMATION | ○ | × | ○ | ·· |
| REMAINING INK AMOUNT | ink1 | ink2 | ink3 | |
| PRINTABLE NUMBER OF SHEETS | pr1 | pr2 | pr3 | ·· |
| USER INFORMATION | User1 | User2 | User3 | |

FIG. 3

RECORDING DEVICE CONFIGURED TO EXECUTE INITIAL INTRODUCTION INCLUDING SUPPLYING COLORING AGENT TO AN INKJET HEAD TO ENABLE RECORDING OPERATION, RECORDING SYSTEM AND CONTROL METHOD THEREFOR

REFERENCE TO RELATED APPLICATIONS

This is a Continuation application of International Application No. PCT/JP2021/033668 filed on Sep. 14, 2021, which claims priority from Japanese Patent Application No. 2020-012164 filed on Jan. 28, 2021. The entire disclosures of the prior applications are incorporated herein by reference.

BACKGROUND ART

Conventionally, various types of recording devices have been proposed that perform recording operations for a set permitted recording number. A known printer is provided with a card interface means to which a memory card can be inserted. The printer allows the user to print only the printable number of sheets written to the memory card.

DESCRIPTION

When using the printer, initial introduction is performed to execute printing operations, such as filling the inkjet head with ink. If the printable number of sheets written in the memory card is made available to the printer before the initial introduction is completed, it will be difficult to use the information in the memory card or the printable number of sheets stored in the memory card with other printers, if the initial introduction is not normally completed. As a result, the convenience of the printing service could be lowered.

Therefore, this specification discloses a recording device, a recording system, and a control method that realize a new recording service that is highly convenient for users.

A recording device according to present disclosure, comprises a recording unit configured to record on a recording medium, and a controller. The controller is configured to perform an initial introduction process of executing initial introduction to enable a recording operation by the recording unit in an initial state where the recording operation by the recording unit is not enabled, a completion determining process of determining whether the initial introduction is normally completed, and a shifting process of shifting a state of the recording device from the initial state to a state where the recording operation by the recording unit is enabled within a permitted recording number of the recording operation by the recording unit in response to determining that the initial introduction is normally completed in the completion determining process.

The contents disclosed in the specification are not limited to an embodiment as a recording device, but are also beneficial when implemented as, for example, a system including a recording device and a server, or a control method in a recording system.

Figure 4:
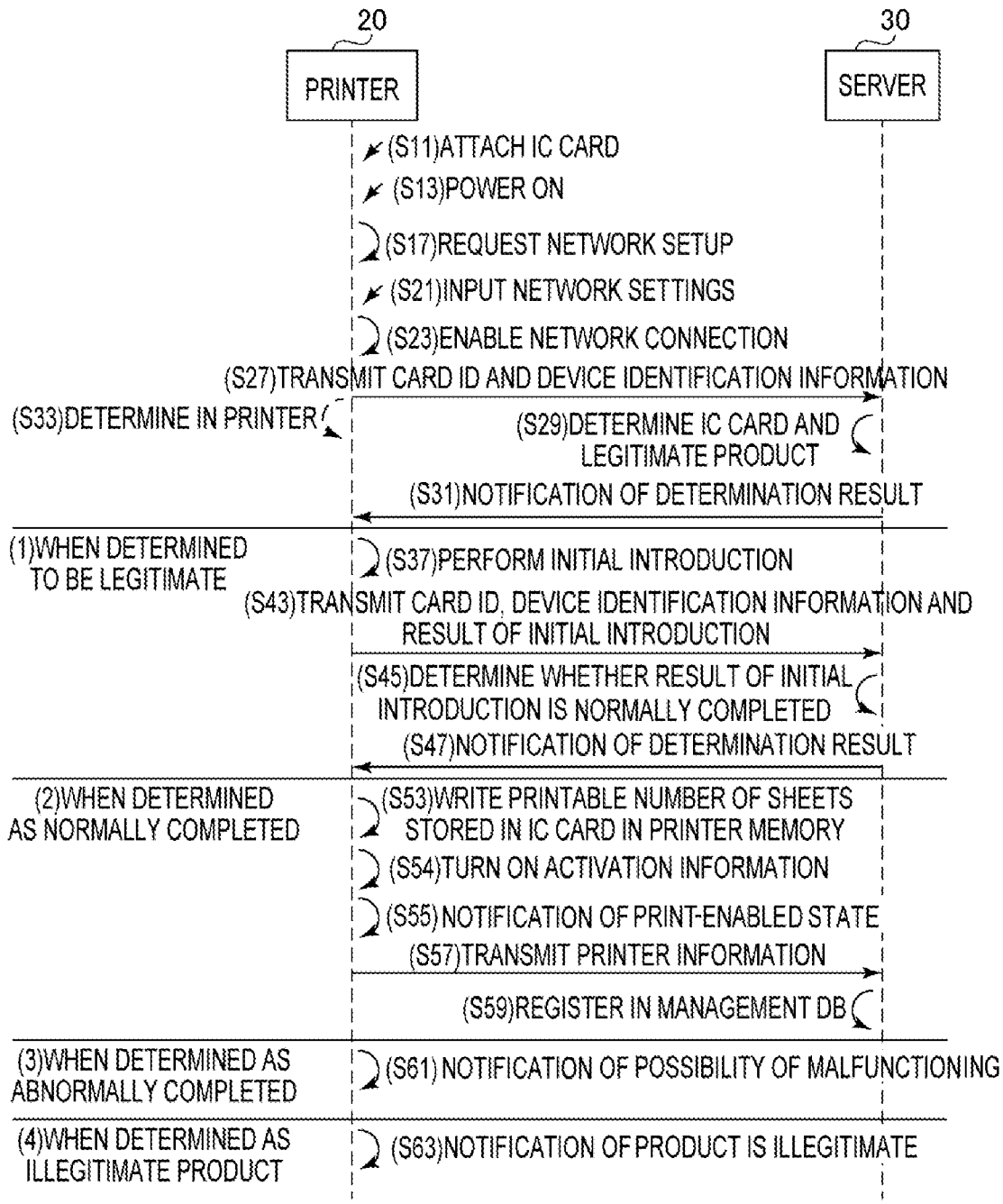
Figure 5:
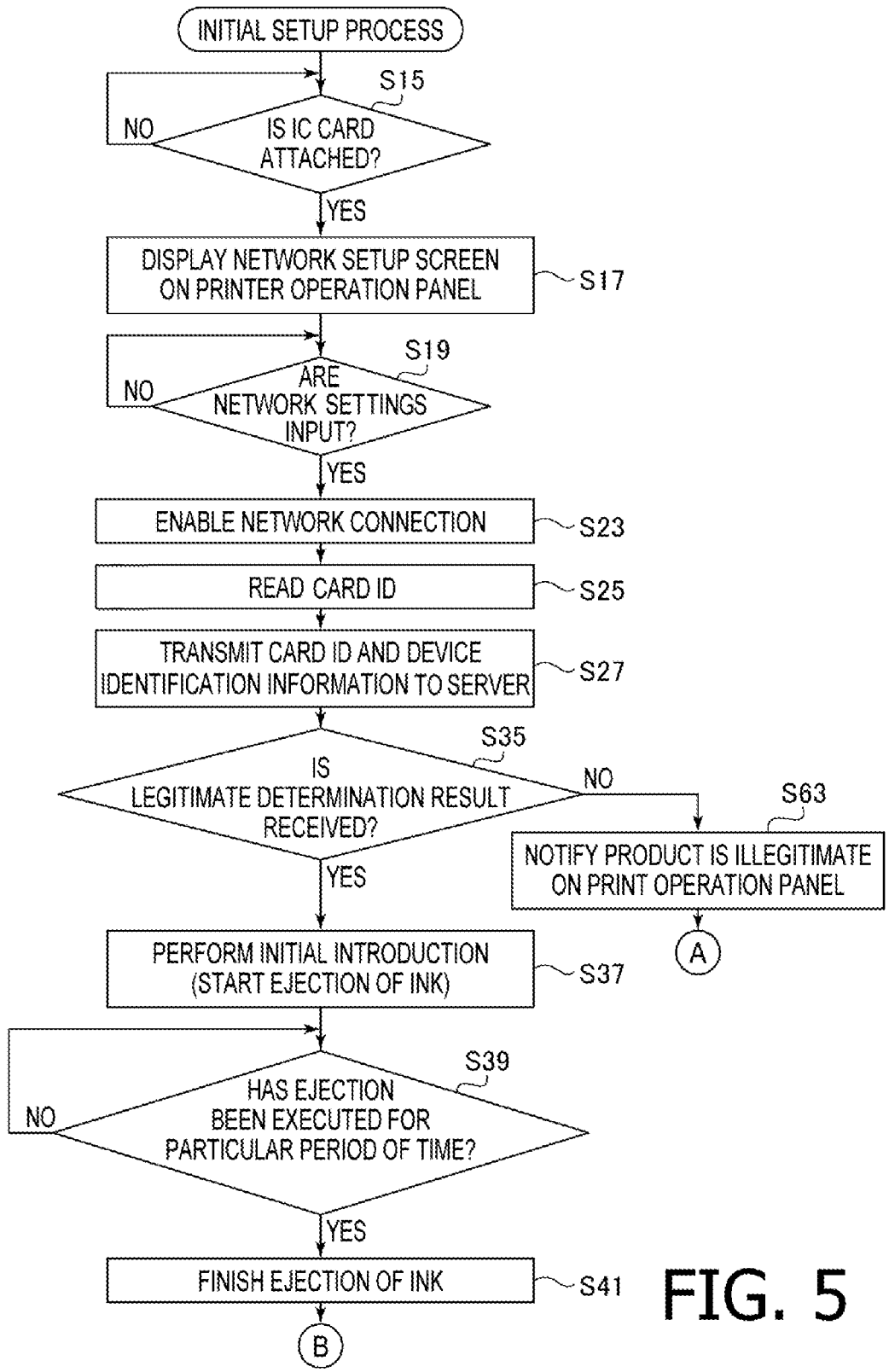
Figure 6:
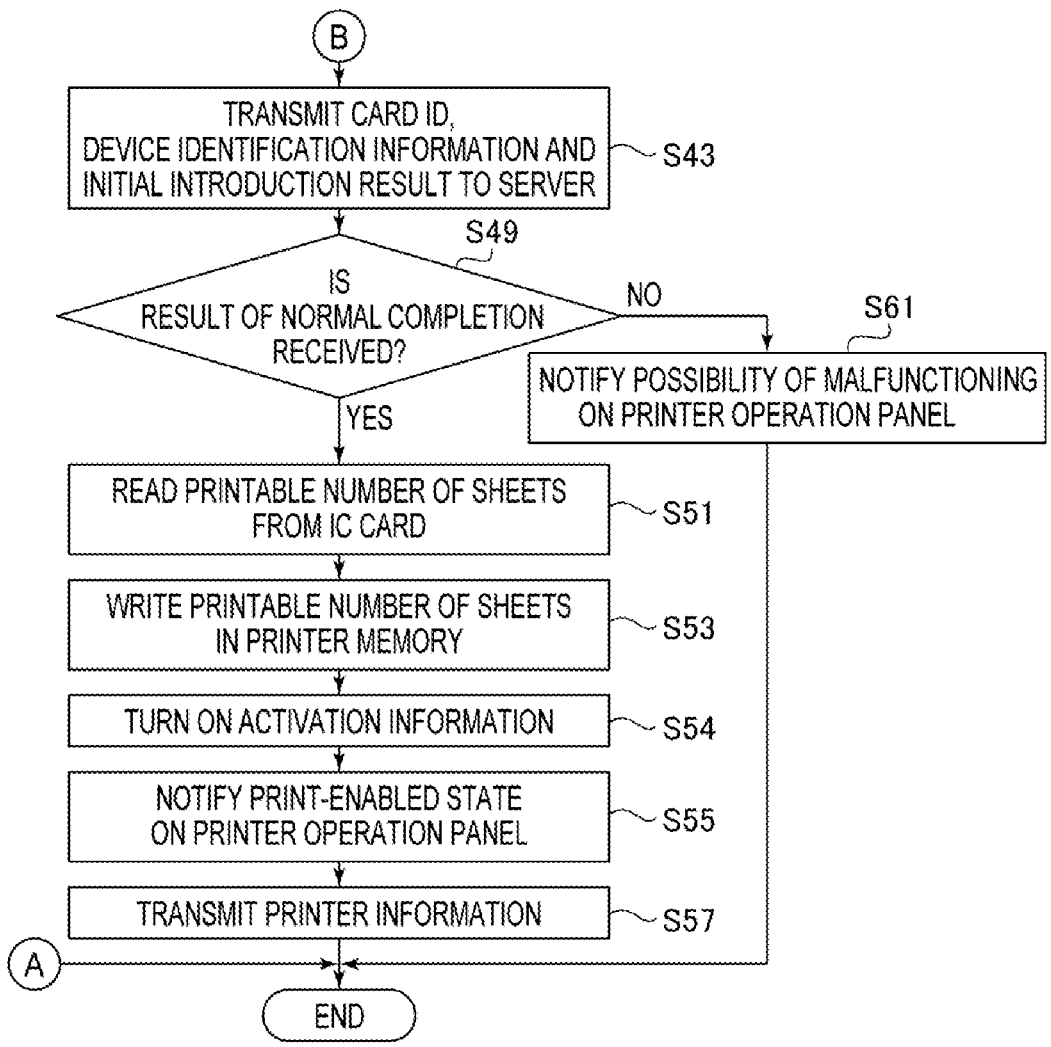
Figure 7:
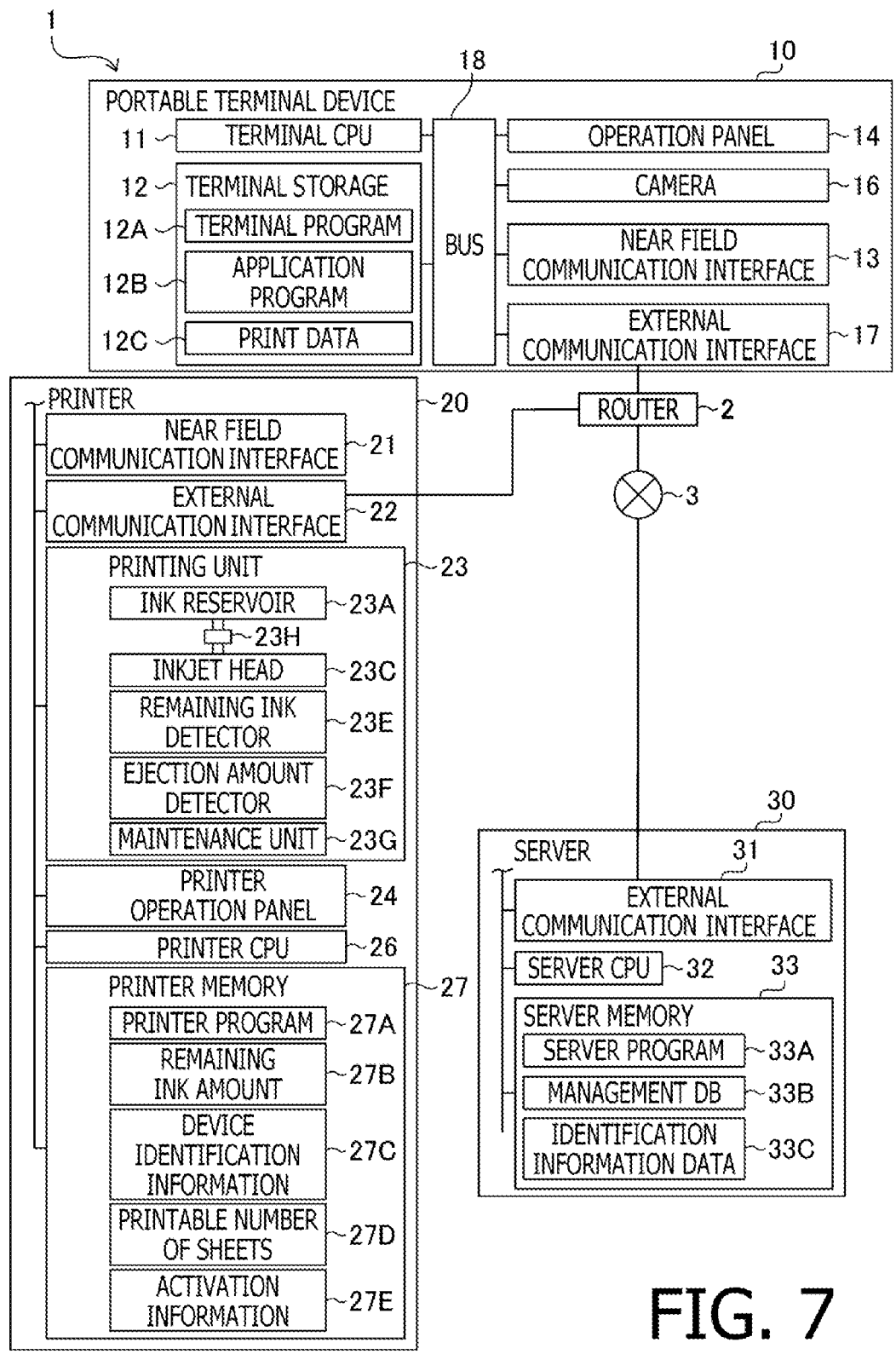
Figure 8:
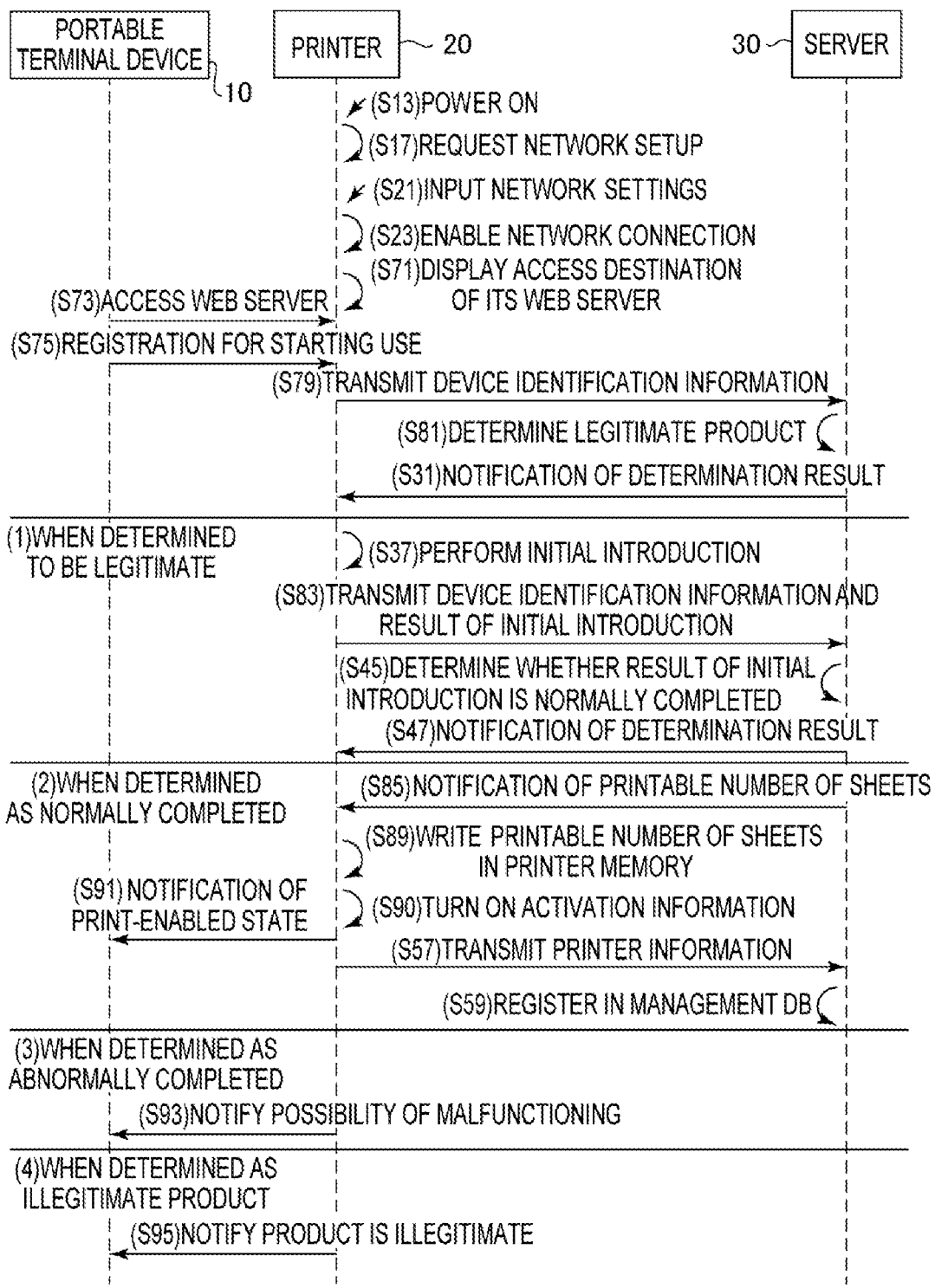
Figure 9:
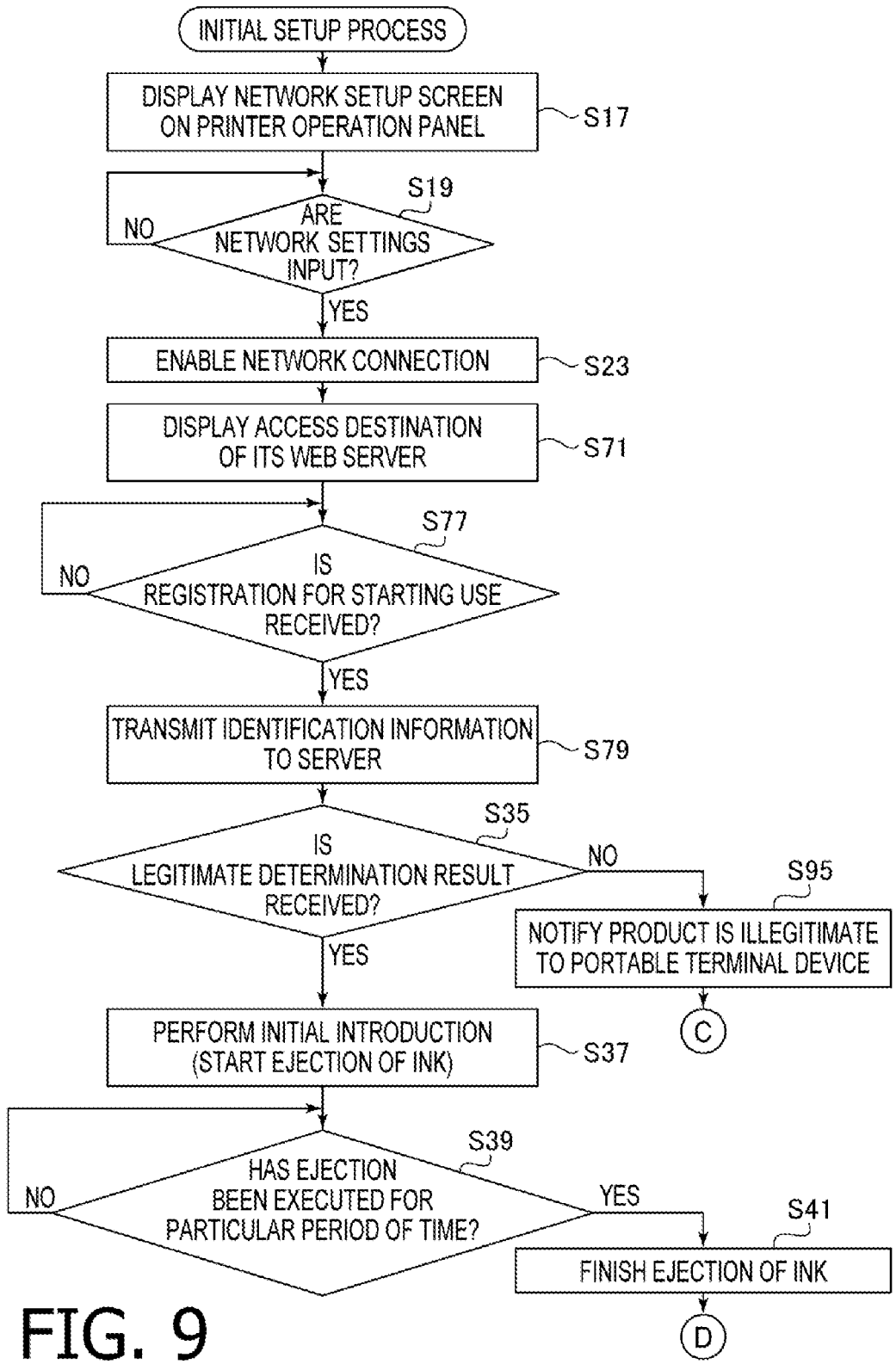
Figure 10:
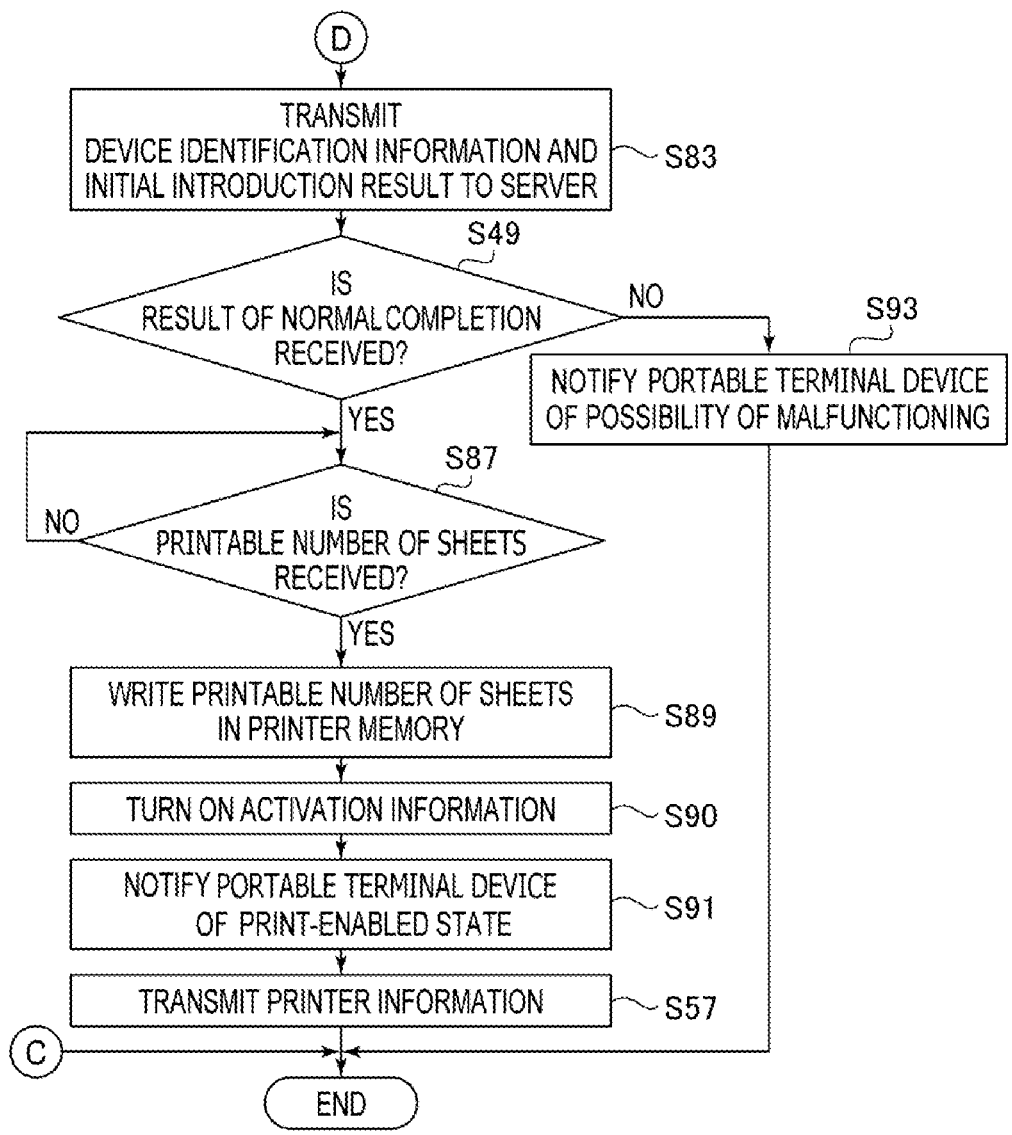

FIG. 1 is a block diagram of a printing system according to a first embodiment.
FIG. 2 is an illustration of card information.
FIG. 3 is an illustration of a management DB.
FIG. 4 is a sequence chart illustrating an initial setup process according to the first embodiment.
FIG. 5 is a flowchart illustrating a process content of a printer in the initial setup process according to the first embodiment.
FIG. 6 is a flowchart illustrating a process content of a printer in the initial setup process according to the first embodiment.
FIG. 7 is a block diagram of a printing system according to a second embodiment.
FIG. 8 is a sequence chart illustrating an initial setup process according to the second embodiment.
FIG. 9 is a flowchart illustrating a process content of a printer in the initial setup process according to the second embodiment.
FIG. 10 is a flowchart illustrating a process content of a printer in the initial setup process according to the second embodiment.

CONFIGURATION OF PRINTING SYSTEM 1

Hereinafter, a printing system according to a first embodiment that embodies the recording system of the present disclosures will be described. FIG. 1 is a block diagram illustrating a configuration of the printing system 1. As shown in FIG. 1, the printing system 1 includes a portable terminal device 10, a printer 20 and a server 30. The printing system 1 is for providing a printing service to users. The printing service here means, for example, a service that enables the user to print as many sheets as the user desires as the user pays a fee for purchasing the printer 20 and a fee for the printable number of sheets, which is the number of sheets that is allowed the user to print by the printer 20.

When a vendor of the printer 20 receives an application from a user to purchase the printer 20, the vendor ships the printer 20 and an IC card 41, described below, to the user. The IC card 41 stores the printable number of sheets. The user can use the printer 20 by attaching the IC card 41 to the printer 20. When, for example, received from the vendor, the IC card 41 may store information of a particular printable number of sheets (e.g., 2000 sheets), or 0 (zero) sheets. After startup with the IC card 41 attached, the printer 20 can use the printable number of sheets stored in the IC card 41 by executing an initial introduction, which will be described later.

The printer 20 according to the present embodiment is, for example, an inkjet printer that performs color printing using an inkjet method. It is noted that, the printer 20 can be an inkjet printer configured to perform monochrome printing. The printer 20 is an example of a recording device according to the present application. The recording device in this application is not necessarily limited the inkjet printer, but can also be, for example, a laser printer that executes printing by electrophotographic method or a thermal printer that executes printing by thermal transfer method. The recording device in this application may be equipped with a facsimile function in addition to or instead of the printing function. In such a case, the recording device may limit the number of facsimiles transmitted or received according to a permitted number of sheets stored on the IC card 41.

An ink reservoir 23A (see FIG. 1) of the printer 20 shipped to the user from the vendor is filled with enough ink to print a particular printable number of sheets (e.g., 2000 sheets) or more (e.g., 10,000 sheets), which is given at the time of purchase. Therefore, in this printing service, the user does not need to fill the printer 20 with ink or replace the ink reservoir 23A after purchasing the printer 20 until the user prints the printable number of sheets assigned by attaching the IC card 41. In this way, the printing system 1 according to the present embodiment eliminates the need to refill the printer 20 with ink, thereby providing a highly convenient service for the user.

If the user continues to use the printer 20 and the particular printable number of sheets (e.g., 2000 sheets) given when the IC card 41 is attached is not sufficient, the user can purchase an additional printable number of sheets by paying an additional fee to increase the printable number of sheets stored in the IC card 41. In the following description, increasing the printable number of sheets is sometimes referred to as "charging." By charging an additional printable number of sheets, the user can continue to use the printer 20.

If the user repeatedly charges an additional printable number of sheets and the printer 20 is running low or out of ink, the user may request a replacement printer 20. The vendor may ship a replacement printer 20 in response to the user's request for a replacement. By replacing the IC card 41 from the old printer 20 to the new printer 20, the user can take over the printable number of sheets and continue using the printing service.

Configuration of Network

As shown in FIG. 1, the portable terminal device 10 and the printer 20 are mutually communicatively connected via a router 2. The user can operate the portable terminal device 10 to give printing instructions to the printer 20. It is noted that, the communication connecting the portable terminal device 10 and the printer 20 can be either wireless communication according to a communication standard such as Wi-Fi (registered trademark of Wi-Fi Alliance) or wired communication such as a LAN. The portable terminal device 10 and the printer 20 may be connected without the router 2. For example, the portable terminal device 10 and printer 20 may be connected by near field wireless communication according to a wireless communication standard such as Bluetooth (registered trademark of Bluetooth SIG, INC.), or by wired communication using a USB cable. There may be multiple portable terminal devices 10 and printers 20, and multiple portable terminal devices 10 may be connected to one printer 20. That is, there may be multiple portable terminal devices 10 that are configured to perform printing and charging processes, and the printer 20 that performs the printing may be selected from multiple printers 20.

The portable terminal device 10 and the server 30 are connected to each other for communication via the router 2 and the Internet 3. The server 30 is, for example, a server used by the vendor of the printer 20. By operating the portable terminal device 10, the user can apply to the server 30 to purchase a printable number of sheets or to replace the printer 20.

Configuration of Portable Terminal Device 10

The portable terminal device 10 is an information processing device operated by a user, which is, for example, a smartphone. It is noted that the portable terminal device 10 is not necessarily limited to the smartphone, but can also be other information processing devices such as a tablet terminal, a PC, and the like. The portable terminal device 10 is configured to receive operations by the user and instruct the printer 20 to print images on printing sheets. The portable terminal device 10 has a terminal CPU 11, a terminal storage 12, a near field communication interface 13, an operation panel 14, a camera 16, and an external communication interface 17. The above components are configured to communicate with each other via a bus 18.

The terminal storage 12 includes a combination of a RAM, a ROM, a flash memory, an HDD, and the like. The terminal storage 12 stores a terminal program 12A and an application program (hereinafter sometimes referred to as an "application") 12B. The terminal program 12A is a program that integrally controls the portable terminal device 10 and provides basic functions and services to the application 12B. The terminal program 12A is, for example, an Android (registered trademark of Google LLC) OS or iOS (registered trademark of Cisco). The application 12B is a program provided by the vendor of the printer 20, for example, and is a program that uses the functions of the terminal program 12A, and the like, to execute various processes such as setting processing for the printer 20, print instructions, and notification processes for the server 30.

It is noted that, in the following description, the terminal CPU 11 that executes the terminal program 12A and/or application 12B may be simply referred to by the name of the terminal device. For example, a description "the portable terminal device 10" may mean "the portable terminal device 10 that executes the terminal program 12A or the application 12B on the terminal CPU 11". Further, as described below, the same applies to the printer 20, which executes a printer program 27A on the printer CPU 26, and to the server 30, which executes a server program 33A on a server CPU 32.

The terminal storage 12 stores the print data 12C. The print data 12C is image data that is subject to the printing process. The near field communication interface 13 is configured to communicate with the printer 20 over a short distance wirelessly. The near field communication interface 13 executes a near field wireless communication in accordance with communication standards such as Bluetooth (registered trademark of Bluetooth SIG, Inc.) and NFC (abbreviation of Near Field Communication), for example. The operation panel 14 is, for example, a touch panel, which is equipped with an LCD panel, a light source such as an LED that illuminates light from the rear side of the LCD panel, and a contact-sensing film attached to the surface of the LCD panel. The operation panel 14 displays various types of information and receives operation input by the user. It is noted that, the portable terminal device 10 does not need to have the near field communication interface 13. Further, the user interface provided to the portable terminal device 10 is not necessarily limited to a touch panel, but may be a combination of, for example, operation buttons, slide switches, a keyboard, a mouse, an LCD, an OLED display, and the like.

The camera 16 is equipped with an image sensor such as a CCD (Charge Coupled Device) and captures images in response to operation inputs to the operation panel 14. The portable terminal device 10 is configured to store the image captured, for example, by the camera 16 in the terminal storage 12, and process the image as print data 12C. It is noted that, the print data 12C is not necessarily limited to the image captured by the camera 16. The print data 12C, for example, can be text data created by the portable terminal device 10.

The external communication interface 17 is configured to transmit and receive data to and from the router 2 by wireless communication in accordance with, for example, the Wi-Fi (registered trademark of Wi-Fi Alliance) communication standard. The portable terminal device 10 is configured to execute communication with the printer 20 and the server 30 via the external communication interface 17. It is noted that, the portable terminal device 10 may communicate with the printer 20 via the near field communication interface 13.

Configuration of Printer 20

The printer 20 has a near field communication interface 21, an external communication interface 22, a printing unit 23, a printer operation panel 24, a printer CPU 26, a printer memory 27, and an attachment interface 28. The near field communication interface 21 is configured to transmit and receive data to and from the near field communication interface 13 of the portable terminal device 10 using near field wireless communication in accordance with the Bluetooth communication standard, for example. The external communication interface 22 is configured to transmit and receive data to and from the router 2 by wireless communication in accordance with, for example, the Wi-Fi communication standard.

The printing unit 23 is equipped with an ink reservoir 23A, an inkjet head 23C, a remaining ink detector 23E, an ejection amount detector 23F, a maintenance unit 23G, and the like, and performs color printing using the inkjet method. The ink reservoir 23A is configured to store, for example, multiple types of ink (magenta, cyan, yellow, and black, and the like). Multiple ink reservoirs 23A are provided for respective types of ink. That is, the printer 20 uses multiple ink reservoirs 23A to store the four types of ink, respectively. The ink reservoirs 23A according to the present embodiment are filled with enough ink to print 10,000 sheets, for example, at the time the printer 20 is shipped from the vendor to the user.

The ink reservoirs 23A are configured such that they cannot be replaced or filled with ink by the user of the printer 20. For example, the ink reservoirs 23A are arranged in positions at which they cannot be touched by a normal user operation. Further, the ink reservoirs 23A are secured to the printer 20 so that they cannot be attached to or detached from the printer 20 by the user. It is noted that, the ink reservoirs 23A may be configured to be replaced by the user.

The printer 20 has a valve 23H between each ink reservoir 23A and the inkjet head 23C. The valve 23H is attached, for example, to a tube that connects the inkjet head 23C to each ink reservoir 23A and is configured to supply ink to the inkjet head 23C. The valve 23H is closed at the time of shipment of the printer 20 from the factory, and regulates the transfer of ink from the ink reservoirs 23A to the inkjet head 23C. Further, the valve 23H is opened based on the control of the printer 20 to allow the transfer of ink from the ink reservoir 23A to the inkjet head 23C.

The remaining ink detector 23E is configured to detect the remaining ink amount, which is the amount of ink stored in the ink reservoir 23A. The remaining ink detector 23E includes an optical sensor arranged in each of the multiple ink reservoirs 23A and is configured to detect the remaining ink amount by detecting the height of the liquid surface of the ink. The remaining ink detector 23E is configured to detect the remaining ink amount in each of the multiple ink reservoirs 23A. The printer 20 stores the remaining ink amount 27B of the ink reservoir 23A of each color in the printer memory 27 and manages the remaining ink amount 27B of each color individually. It is noted that, the printer 20 may manage only the remaining ink amount 27B of at least one color in the ink reservoirs 23A.

The inkjet head 23C has a plurality of nozzles configured to eject ink onto the printing sheet. The printing unit 23 executes printing on the printing sheet by ejecting ink stored in the ink reservoirs 23A from the inkjet head 23C onto the printing sheet. The ejection amount detector 23F is configured to detect the amount of ink ejected from the nozzles of the inkjet head 23C. A method for detecting the ejection amount is not limited, and may be, for example, a method using a thermocouple. The ejection amount detector 23F may be equipped with a thermocouple at a position opposite the ejection port of each nozzle. The temperature of thermocouples changes when ink ejected from each ejection port adheres to the thermocouples. The printer 20 may detect the ejection amount based on the temperature change (i.e., the cooling effect) of the thermocouple in the ejection amount detector 23F.

The maintenance unit 23G is equipped with a cap, a pump for suction, and a waste liquid tank, and the like, and by driving the pump while the cap is attached to the nozzle surface of the inkjet head 23C, ink is sucked from the inkjet head 23C into the waste liquid tank. The printer 20 performs a so-called suction purge, in which the maintenance unit 23G suctions ink clogged in the inkjet head 23C, for example, when recovering from a nozzle clogging. It is noted that, the printer 20 may be configured without the maintenance unit 23G. Alternatively, the maintenance unit 23G may be configured to apply positive pressure to the inkjet head 23C to cause ink to drain from the inkjet head 23C.

The printer operation panel 24 includes a touch panel and switch configured to receive user operation input for the printer 20. It is noted that, the printer operation panel 24 may not be equipped with an output device such as the touch panel, but only with input devices such as switches and buttons. The printer CPU 26 is configured to integrally control the printer 20. The printer memory 27 is configured as a combination of a RAM, a ROM, a flash memory, an HDD, and the like, for example. The printer memory 27 contains a printer program 27A. The printer CPU 26 controls the various parts of the printer 20 by executing the printer program 27A. The printer 20 is configured such that, as the printer CPU 26 executes the printer program 27A, the CPU 26 causes the printing unit 23 to print the print data 12C obtained from the portable terminal device 10. Obtaining in this application is a concept that includes not only a process of actively retrieving information by notifying other devices, but also a passive process of obtaining information based on receiving notifications from other devices.

The printer memory 27 stores device identification information 27C identifying the printer 20. The device identification information 27C is, for example, a serial number set by the vendor of the printer 20 and is unique information that can identify any printer 20 from any other printer 20. It is noted that, the device identification information 27C is not necessarily limited to a serial number, but can be, for example, a wired MAC address of the near field communication interface 21 or the external communication interface 22, or a wireless MAC address.

The attachment interface 28 is an interface configured to read data from and write data to the IC card 41. The IC card 41 is, for example, an IC card for which contact-type reading and writing are performed. The IC card 41 is an example of an external storage medium according to the present application. It is noted that, the external storage medium according to the present application is not necessarily limited to the contact-type IC card, but can also be a non-contact-type IC card, a memory card such as an SD card, or an external storage medium such as a USB memory.

FIG. 2 shows an example of card information 41A stored on the IC card 41. As shown in FIG. 2, the card information 41A includes a card ID, the printable number of sheets, and activation information. The card ID is information that is used to individually identify the IC card 41. In FIG. 2, the card ID is stored with a value of "CID1" as an example. The printable number of sheets is information indicating the number of sheets printing sheet that are allowed to be printed by the printer 20, as described above. In FIG. 2, a value of "pr1" is stored as an example for the printable number of sheets. The printer 20 decreases the printable number of sheets each time the printing unit 23 performs printing. The printer 20 inhibits printing by the printing unit 23 when the printable number of sheets reaches zero. The printable number of sheets is an example of a permitted recording number in this application.

The activation information is information that indicates whether the user is permitted to perform each function, such as printing. The activation information indicates, for example, that the printing operation of the printing unit 23 is permitted when set to the ON state and that the printing operation of the printing unit 23 is restricted when set to the OFF state. The IC card stores activation information in the off state at the time when shipped from the vendor to the user or when purchased at an electronics retail store, for example. When the activation information is off, printing operation is inhibited even if the printable number of sheets is more than or equal to one. It is noted that, the printing system 1 may control the activation information so that for one IC card 41 (card ID), there is only one printer 20 whose activation information is turned on. In such a case, the activation information is set exclusively so that no more than one printer 20 can print at the same time with one card ID.

A single card ID may be used to make multiple printers 20 printable. For example, multiple IC cards 41 with the same card ID may be issued, and the printing system 1 may provide a service that allows simultaneous printing at each of the printers 20 with each IC card 41 attached. In FIG. 2, an "0" indicates that an item is set to the on state, while an "X" indicates that the item is set to the off state. The card information 41A shown in FIG. 2 is only an example. For example, the IC card 41 may store the remaining ink amount 27B detected by the printer CPU 26 as the card information 41A.

Configuration of Server 30

Next, a configuration of the server 30 will be described. The server 30 is provided with an external communication interface 31, the server CPU 32, and a server memory 33. The server 30 is a server managed by the vendor of the printer 20, for example. The external communication interface 31 is connected to the router 2 via the Internet 3 and configured to transmit/receive data to/from the router 2. The server CPU 32 is configured to integrally control the server 30. The server memory 33 is configured by a combination of a RAM, a ROM, a flash memory, an HDD, and the like. The server memory 33 contains a server program 33A, a management DB 33B, and identification information data 33C. The server 30 is configured such that the server CPU 32 executes the server program 33A in the server memory 33 to execute an updating process of the management DB 33B, a communication process with the portable terminal device 10 via the router 2, and the like.

As the management DB 33B, information on printers 20 using the printing service and other information is stored. As shown in FIG. 3, in the management DB 33B, the device identification information 27C, the card ID, the activation information, the remaining ink amount 27B, the printable number of sheets, and the user information are stored in an associated manner. The device identification information 27C is the identification of the printer 20 described above. As the device identification information 27C, the values "dv1, dv2, dv3, . . . " are stored as an example in FIG. 3. The card ID is a card ID of the IC card 41 attached to the printer 20 identified by the device identification information 27C. As card IDs, the values "CID1, CID2, . . . " are stored in FIG. 3 as an example. Similarly, the activation information and remaining ink amount 27B are the activation information and remaining ink amount 27B for the printer 20 identified by the device identification information 27C. As the remaining ink amount 27B, values "ink1, ink2, ink3, . . . " are stored as an example in FIG. 3. The printable number of sheets is the number of sheets stored in the IC card 41 installed in the printer 20. As the printable number of sheets, values "pr1, pr2, pr3, . . . " are stored as an example in FIG. 3. The user information is information of the user of the printer 20, which is registered at the time of starting to use the printer 20, or the like, as described below. As user information, values "User1, User2, . . . " are stored as an example in FIG. 3.

The identification information data 33C contains the card ID of the IC card 41 sold by the vendor and the device identification information 27C of the printer 20. The server 30 determines whether the transmission source printer 20 or the IC card 41 is legitimately sold by the vendor based on whether the card ID and device identification information 27C obtained from the printer 20 are registered in the identification information data 33C, as described below. Therefore, the card ID and device identification information 27C registered in the identification information data 33C are, for example, information on the IC card 41 and the printer 20 that were manufactured and sold by the vendor through authorized channels. It is noted that, the database of the card IDs and the database of the device identification information 27C may be separate databases.

Initial Setup Process

Next, the user's tasks in the initial setup process to set up the printers 20 and the processing of each device will be described. When the user purchases a printer 20 for the first time, for example, and receives the printer 20 from the vendor, the user performs the setup process shown in FIG. 4. Each of the printer 20 and the server 30 performs each process in accordance with the user's work. The printer 20 performs the processes shown in FIG. 5 and FIG. 6 in accordance with the initial setup process shown in FIG. 4. It is noted that, in the sequence chart in FIG. 4, the work by the user (human) is indicated by an arrow pointing diagonally down to the left. The contents and order of the processes and tasks shown in FIG. 4 and thereafter are only examples. In the following description, the processes are explained by dividing the same into four stages (1) through (4) in FIG. 4.

In step (hereafter simply referred to as S) 11 of FIG. 4, the user attaches the IC card 41 to the attachment interface 28 of the printer 20 shipped by the vendor. This IC card 41 can be a card that was shipped by the vendor with the printer 20, or it can be a card purchased at an electronics retail store. As described above, the IC card 41 stores activation information in the off state at the time it is shipped to the user from the vendor or purchased at an electronics retail store. The printer 20 is in a state where it cannot perform printing operations (hereinafter referred to as the initial state) because the activation information on the IC card 41 is in the off state.

After attaching the IC card 41, the user turns on the printer 20 by operating the power button on the printer operation panel 24 (S13). On the other hand, as shown in FIG. 5, when the printer 20 is turned on and power is supplied, the printer CPU 26 executes the printer program 27A to start the system. After starting the system, the printer 20 determines whether an IC card 41 is attached to the attachment interface 28 (S15). The printer 20 determines, based on the contents of the signal that is energized through the terminals of the attachment interface 28, whether the IC card 41 is correctly attached to the attachment interface 28. The term "correctly installed" means, for example, a state in which it is confirmed that the IC card 41 is attached to the attachment interface 28 in the correct orientation, that read and write operations can be performed on the IC card 41, and that the required card information 41A has been written to the IC card 41.

When the IC card 41 is not correctly attached to the attachment interface 28 (S15: NO), the printer 20 repeats the determining process of S15. It is noted that, when the printer 20 cannot confirm that the IC card 41 has been attached after a particular period of time has elapsed after the startup, for example, the printer 20 may display a warning on the printer operation panel 24 urging the user to insert the IC card 41.

When the IC card 41 is correctly installed in the attachment interface (S15: YES), the printer 20 requests a network setup (S17). For example, the printer 20 displays a message on the printer operation panel 24, such as "Please perform network settings." After displaying the message, when the printer 20 receives a particular operation input to the printer operation panel 24, the printer 20 displays a setting screen on the printer operation panel 24 that receives the SSID and encryption key, or the IP address and default gateway, and receives the communication settings of the external communication interface 22.

After displaying the network setup screen in S17, the printer 20 determines whether the network settings have been received or not (S19). The user checks the display on the printer operation panel 24, inputs network settings such as the SSID and other information for the router 2, and executes the network setup (S21 in FIG. 4). After entering the network settings, for example, the user presses the determine button displayed on the printer operation panel 24. When detecting the press of a determination button, the printer 20 makes a positive determination in S19 (S19: YES) and enables the network connection (S23). It is noted that, when the network settings are not entered after a particular amount of time has elapsed after displaying the setting screen (S19: NO), the printer 20 may provide notification of an error.

The printer 20 supplies power to the near field communication interface 21 or the external communication interface 22, for example, to enable the printer 20 to communicate with external devices. Further, the printer 20 accesses the router 2 through the external communication interface 22 via wireless communication according to the Wi-Fi communication standard, using the SSID and encryption key entered by the user. In this way, the printer 20 becomes capable of communicating with the router 2 (S23). This allows the printer 20 to communicate with the portable terminal device 10 and the server 30 via the external communication interface 22 and the router 2.

Next, the printer 20 performs reading of the IC card 41 (S25). The printer 20 reads the card ID from the IC card 41 attached to the attachment interface 28. The printer 20 transmits the read card ID and device identification information 27C of the printer 20 to the server 30 (S27). The printer memory 27 stores, for example, information (e.g., URL or global IP address) of the vendor's server 30 access destination. In S27, the printer 20 accesses the server 30 based on the access destination information stored in advance in this printer memory 27 and transmits the card ID and other information to the server 30 (S27). It is noted that the printer 20 may inquire the access destination information to the portable terminal device 10, or the like.

When receiving the information in S27 from the printer 20, the server 30 determines whether each of the IC card 41 and printer 20 is a legitimate product or not (S29) based on the received information. When each of the card ID and the device identification information 27C received in S27 is registered in the identification information data 33C, the server 30 determines that the IC card 41 and the printer 20 are legitimate products (S29: YES). On the other hand, when one of the card ID and the device identification information 27C received in S27 is not registered in the identification information data 33C, the server 30 determines that the IC card 41 and the printer 20 are not the authorized products (S29: NO). After executing the determining process for legitimate products in S29, the server 30 notifies the printer 20 of the result of the determination of legitimate products, i.e., whether the card ID and/or the device identification information 27C are registered in the identification information data 33C (S31).

It is noted that the method of determining whether the product is legitimate is not necessarily limited to the method of using the identification information data 33C described above. For example, the server 30 associate only one printer 20 with one IC card 41 (i.e., the card ID). In such a case, when the card ID received in S27 is already associated with another printer 20 in the management DB 33B, the server 30 may determine that it is not a legitimate product. Alternatively, the server 30 may associate only one printer 20 of which activation information is turned on with one IC card 41. When the card ID received in S27 is already associated with another printer 20 in the management DB 33B and the associated activation information is in the on state, the server 30 may determine that the IC card 41 is not legitimate product. This makes it possible to prevent the use of counterfeit IC cards 41.

The server 30 may transmit the information received in S27 to the vendor or the like to execute the process of inquiring whether the information is registered or not, or the server 30 may print the received information and receive the check result by the vendor's administrator who has seen the printed material. The server 30 may associate the printer 20 and the IC card 41 in advance and register them in the management DB 33B, or the like. The vendor ships the printer 20 and the IC card 41 of which the device identification information 27C and the card ID are associated with each other, to the user. In this way, when the card ID and device identification information 27C received in S27 are associated with each other and registered in the management DB 33B, the server 30 may determine that the IC card 41 and the printer 20 are legitimate products (S29: YES). Alternatively, the server 30 may receive only one of the card ID and the device identification information 27C from the printer 20 to determine whether the product is legitimate or not.

A device other than server 30, e.g., the printer 20, may perform the determination of whether the product is legitimate. For example, the card ID of the IC card 41 previously associated with the printer 20 is stored in the printer memory 27. As shown in S33 in FIG. 4, after reading the card ID of the IC card 41 in S25, if the card ID read matches the card ID stored in the printer memory 27 (ID associated in advance), the printer 20 may determine that a legitimate IC card 41 has been inserted, and the processes described in S37 onward may be executed.

(1) When Determined to be Legitimate

As shown in FIG. 5, when executing the transmitting process of S27, the printer 20 determines whether the determination result received from the server 30 indicates that the product has been determined to be legitimate (S35). When receiving the result of the determination that the printer 20 is a legitimate product (S35: YES), the printer 20 performs the initial introduction (S37). Here, the initial introduction is, for example, a preparatory process for printing by the printing unit 23. As an example of the initial introduction, for example, an operation to pass the ink in the ink reservoir 23A to the inkjet head 23C can be employed. Concretely, the valve 23H (see FIG. 1) of the printer 20 is closed when the printer 20 is shipped from the vendor and before the initial introduction is performed. On the other hand, on the inkjet head 23C side, shipping liquid is filled. Shipping liquid is a liquid that is filled into the ink channels in the state in which the printer 20 is shipped from the factory to maintain the condition of the tubes and other channels. When starting the initial introduction (S37), the printer 20 opens the valve 23H and allows ink to flow from the ink reservoir 23A to the inkjet head 23C. A method of allowing ink to flow through to the inkjet head 23C is to drive the inkjet head 23C until the liquid filling the channels of the inkjet head 23C is replaced with the ink. As another method of replacing the liquid in the channel of the inkjet head 23C, instead of driving the inkjet head 23C, the maintenance unit 23G (see FIG. 1) may be driven, for example, to suction the shipping liquid from the nozzle side of the inkjet head 23C, thereby discharging the shipping liquid from the nozzle of the inkjet head 23C. Alternatively, a printing operation (test printing) may be performed to eject the shipping liquid from the inkjet head 23C.

The printer 20 may perform a process to check the nozzles of the inkjet head 23C for clogging or perform a test print as the initial introduction. When the printing unit 23 is configured to print in accordance with the electro-photographic method, the printer 20 may perform, for example, an operation to rotate the toner agitator in the toner compartment for a particular period of time, so-called "toner agitation," to agitate the toner and supply the toner to the developing rollers.

As shown in FIG. 5, when starting the initial introduction (S37), the printer 20 fills the inkjet head 23C with ink from the ink reservoir 23A and ejects ink (including shipping liquid) from the inkjet head 23C. After starting ejection of the ink, the printer 20 determines whether ejection has been executed for a particular period of time (S39). The printer 20 continues to eject ink until the particular period of time has elapsed (S39: NO). When the particular period of time has elapsed (S39: YES), the printer 20 finishes ejection of ink, i.e., completes the initial introduction (S41).

When completing the initial introduction in S37, S39 and S41, the printer 20 transmits the results of the initial introduction to the server 30 (S43). For example, the printer 20 detects the ejection amount of ink by the ejection amount detector 23F during the initial introduction, in which ink is ejected in S37 onward, and transmits the detected ejection amount to the server 30 as a result of the initial introduction. For example, the printer 20 transmits the ejection amount detected by the ejection amount detector 23F after starting ejection and at the point when the increasing amount of ejection is lowered and the change amount is stabilized to the server 30 as the result of the initial introduction. Alternatively, the printer 20 may detect the ejection amount per unit of time after a particular amount of time, e.g., after a work time required to displace the shipping liquid to ink has elapsed, and transmit the detected ejection amount as the result of the initial introduction. Further, the printer 20 may transmit the sum of the ejection amounts detected while performing the initial introduction, and transmits the sum of the ejection amounts to the server 30 as the result of the initial introduction. The server 30 determines whether the initial introduction has been normally completed based on the ejection amount received from the printer 20, as will be described later. Therefore, the particular time referred to in the determination in S39 is the time required to detect the ejection amount in the initial introduction, for example, the time required that the ejection amount stabilizes to the extent that it can be determined whether the initial introduction has been normally completed.

The printer 20 transmits the card ID and the device identification information 27C to the server 30 in S43, along with the results of the initial introduction. It is noted that, the server 30 may transmit only one of the device identification and the card ID to the server 30. Upon receiving the information transmitted in S43, the server 30 determines whether the result of the initial introduction is normally completed (S45) for the printer 20 from which the information was transmitted. When, for example, the ejection amount received is within a particular reference range, the server 30 determines that the initial introduction has been normally completed (S45: YES). The lower limit that defines the range referred to in the determining process of S45 is, for example, the lower limit of the ejection amount that can be detected when the ejection amount is reduced due to a blockage of the tube or nozzle. On the other hand, the upper limit is, for example, the maximum ejection amount that can be detected when the nozzle is damaged and an excessive amount is ejected from the inkjet head 23C. Therefore, as the reference range, the range of ejection amounts normally ejected from the inkjet head 23C without the above-mentioned abnormality can be set. It is noted that, the server 30 may be configured to make the determination of normality of the ejection amount in S45 using only the lower or upper limit.

When determining that the initial introduction has been normally completed (S45: YES), the server 30 notifies the printer 20 of the result of the determination that the initial introduction has been normally completed (S47). Further, when the received ejection amount is outside the particular reference range, the server 30 determines that the initial introduction has not been completed normally (S45: NO) and notifies the printer 20 of the result of the determination of abnormal completion (S47).

It is noted that, the method of determining the contents of the initial introduction process and/or whether the initial introduction has been normally completed is not necessarily limited to the methods mentioned above. For example, when the printer 20 has a scanner function, the printer 20 performs filling of ink to the inkjet head 23C and then performs a test print. The printer 20 displays a message on the printer operation panel 24 requesting scanning of the printed test page. Reviewing the message, the user performs scanning of the test page with the scanner of the printer 20. The printer 20 transmits the image data of the scanned test page to the server 30. Alternatively, the user may capture the test page with the camera 16 of the portable terminal device 10 and transmit the captured image data to the server 30. By analyzing the image data received from the printer 20 or the portable terminal device 10, the server 30 determines whether the initial introduction has been normally completed. The server 30 may determine that the initial introduction has been normally completed when, for example, the test pattern printed on the test page has formed a desired test pattern with no missing dots, dot misalignment, or the like, or when a particular percentage or more of dots have been normally formed. Further, the printer 20 and the server 30 may use both the above method of determining the ejection amount of ink and the method of analyzing image data to determine whether the initial introduction has been normally completed.

Alternatively, the process to confirm the completion of the initial introduction may be, for example, a process to check whether the touch panel of the printer operation panel 24 can be displayed normally, or a process to receive setting information such as clock information and check whether the setting can be normally displayed on the touch panel (i.e., whether the setting can be reflected). Further alternatively, the process to confirm the completion of the initial introduction may include a process of checking whether physical mechanisms such as conveying rollers and the inkjet head 23C are working properly and whether the printing sheet is conveyed and printing is performed normally.

Further, the determination of whether the result of the initial introduction is normal or not may be performed by a device other than the server 30, e.g., the printer 20. The printer 20 may be configured to notify the user or the server 30 of an error or the like if, for example, the ejection amount detected in the initial introduction is outside the reference range. Alternatively, the printer 20 may be configured to notify the server 30 that the initial introduction has been normally completed when the ejection amount detected in the initial introduction is within the reference range. Then, when receiving a response to the notification from the server 30, the printer 20 may perform processes in S53 onward (e.g., a process of writing the printable number of sheets) as will be described later.

(2) When Determined as Normally Completed

As shown in FIG. 6, after transmitting the results of the initial introduction and the like in S43, the printer 20 determines whether the printer 20 has received the results of the determination of normal completion from the server 30 (S49). When receiving the determination result of normal completion (S49: YES), the printer 20 reads the printable number of sheets from the IC card 41 (S51). As described above, the IC card 41 is charged with a particular printable number of sheets, for example, at the time the IC card 41 is sent from the vendor. The printer 20 writes the printable number of sheets read in S51 to the printer memory (S53). Then, the printer 20 sets the activation information of the card information 41A to an ON state (S54).

In this way, the printer 20 is in a print-enabled state, where printing by the printing unit 23 can be performed within the printable number of sheets. The printer 20 uses the printable number of sheets stored in the printer memory 27 to perform printing and other operations. For example, when printing based on a print instruction received from the portable terminal device 10 is completed, the printer 20 subtracts the number of sheets of printed sheets (hereinafter referred to as "printed number of sheets") from the printable number of sheets in the printer memory 27. Further, the printer 20 updates the information on the printable number of sheets on the IC card 41 with the printable number of sheets after decreasing the number of sheets. Further, the printer 20 notifies the server 30 of the information on the printable number of sheets after decreasing the number of sheets. The server 30 updates the printable number of sheets associated with the device identification information 27C of the transmission source printer 20 in the management DB 33B based on the printable number of sheets received from the printer 20, thereby synchronizing the printable number of sheets.

It is noted that, S53 and S54 are examples of the shifting process in this application. The printer 20 may be configured not to use the activation information. For example, the printer 20 may be configured to move to the print-enabled state by simply executing S53 and writing the printable number of sheets to the printer memory 27. That is, the printer 20 may complete the shifting process of this application only by executing S53 to write the printable number of sheets. In such a case, the printer 20 may be configured not to execute S54. The server 30 may be configured not to manage the activation information. The printer 20 may be configured to read the printable number of sheets from the IC card 41 as appropriate, without transmitting the printable number of sheets from the IC card 41 to the printer memory 27. For example, the printer 20 reads the printable number of sheets from the IC card 41 before starting the printing process. When completing printing, the printer 20 subtracts the printed number of sheets from the printable number of sheets in the IC card 41, and may update the printable number of sheets in the IC card 41 with the decreased value (i.e., the printable number of sheets after the printed number of sheets have been subtracted).

The IC card 41 may be set to zero as the printable number of sheets at the time the IC card 41 is sent by the vendor. In such a case, the printer 20 may write "zero sheets" to the printer memory 27. Alternatively, the printer 20 may perform a charge to the IC card 41. When receiving the determination result of normal completion from the server 30 in S47, the printer 20 may write a particular printable number of sheets to the IC card 41.

After executing S54, the printer 20 notifies the user that the printer 20 is in the print-enabled state (S55). For example, the printer 20 may inform the user that the printer 20 is in the print-enabled state by displaying, on the printer operation panel 24, a message such as "It is ready to perform printing." Alternatively, the printer 20 may turn on or off a particular indicator lamp to notify the user that the printer 20 is in the print-enabled state.

After executing S55, the printer 20 transmits the printer information to the server 30 (S57). The printer 20 transmits information of the card ID, the printable number of sheets, the activation information, the printing device identification information 27C, and the remaining ink amount detected by the remaining ink detector 23E, as printer information, for example, to the server 30. At this stage, the remaining ink amount 27B is almost full (e.g., remaining amount sufficient to print 10,000 sheets). The server 30 registers the card ID, and other information received from the printer 20 in the management DB 33B (S59). As a result, information of the printer 20 for which the initial introduction has been normally completed is registered in the management DB 33B.

It is noted that, the server 30 may perform the registration of the management DB 33B as appropriate, without performing the registration collectively in S59. For example, the server 30 may register the card ID and the device identification information 27C in the management DB 33B after determining that the product is legitimate in S29, and register the activation information ("ON" status) in the management DB 33B after determining normal completion in S45. If the initial setup process is interrupted in the middle due to network failure, or other reasons, the server 30 may retain the information up to the point of time of interruption and resume the setup process at the next and subsequent setup processes from the point in time of interruption or from the beginning (i.e., from the determination of the legitimate product in S29).

The server 30 may perform the process of registering user information in the management DB 33B in association with the printer 20 information. For example, the printer 20 may display a message on the portable terminal device 10 encouraging user registration if accessed by the portable terminal device 10 during or after the setup process in FIG. 4, FIG. 5, or FIG. 6. When receiving a notification from the printer 20 requesting the user registration, the portable terminal device 10 receives user information from the user via the operation panel 14. This user information includes, for example, information about the user who uses the printer 20, such as the user's name, address, age, gender, occupation, contact e-mail address, payment method, and the like. The portable terminal device 10 notifies the server 30, for example, of the received user information, the device identification information 27C of the printer 20, and the card ID. In this way, the server 30 can register the user information in the management DB 33B in association with the device identification information 27C, and the like, of the printer 20.

(3) When Determined as Abnormally Completed

When receiving the determination result of abnormal completion in S47, the printer 20 makes a negative determination in S49 in FIG. 6 (S49: NO) and notifies the user that the printer 20 may be malfunctioning (S61). For example, the printer 20 displays a message on the printer operation panel 24 indicating that the printer body may be malfunctioning. It is noted that, the printer 20 may be configured to indicate where to inquire about malfunctioning of the printer 20 or where to apply for a replacement on the printer operation panel 24.

(4) When Determined as Illegitimate Product

When receiving the determination result from the server 30 that the printer 20 is not a legitimate product (i.e., the printer 20 is an illegitimate product) in S31, the printer 20 makes a negative determination in S35 of FIG. 5 (S35: NO), and notifies the user that the IC card 41 and/or printer 20 are illegitimate products (S63). For example, the printer 20 displays, on the printer operation panel 24, messages such as "IC card and/or Printer may be an illegitimate product" or "IC card and/or Printer may have a problem." When notified by the server 30 which of the card ID and the device identification information 27C is not registered in the identification information data 33C, or which of the two is abnormal, the printer 20 may identify and report the one (the IC card 41 or the printer 20) that was notified to be in the abnormal state. The printer 20 may display, on the printer operation panel 24, messages such as "Registration of IC card cannot be confirmed by the vendor, and please contact us for Replacement of IC card."

In the first embodiment above, the printer 20 is an example of a recording device. The external communication interface 22 is an example of a communication interface. The ejection amount detector 23F is an example of a consumption sensor. The printing unit 23 is an example of a recording unit. The printer CPU 26 is an example of a controller. The printer memory 27 is an example of a memory. The device identification information 27C is an example of recording device identification information. The printable number of sheets is an example of a permitted recording number and recording permission information. The attachment interface 28 is an example of a reading unit. The IC card 41 is an example of an external storage medium. The card ID is an example of a medium identification information piece. S37 is an example of an initial introduction process or an initial introduction step. S49 is an example of a completion determining process or completion determination step. S53 and S54 are examples of a shifting process or a shifting step. S43 is an example of a transmitting process, a first transmitting process. S17 and S19 are examples of a communication setting determining process. S45 is an example of a result determining process. S47 is an example of a second transmitting process. S27 is an example of a third transmitting process. S29 is an example of a registration process. S31 is an example of a fourth transmitting process.

(Effect) According to the first embodiment described above, the following effects are achieved.

(1) The printer 20 of the first embodiment performs an initial introduction to enable the printing unit 23 to perform printing (S37) in the initial state where printing by the printing unit 23 is not possible, determines whether the initial introduction has been normally completed (S49), and then, based on the determination that the initial introduction has been normally completed (S49: YES), the printer 20 shifts from the initial state to the print-enabled state (S53, S54). According to this, after the initial introduction is normally completed, the printer 20 moves to the print-enabled state. Accordingly, in a case where the initial introduction is failed or the like, the printer 20 does not write the printable number of sheets to the printer memory 27 or change the activation information 27E to the ON state. Therefore, it is possible to prevent the IC card 41 from being associated with a printer 20 that failed initial introduction, i.e., a printer that needs to be replaced, or the like and registered with the server 30. Conversely, it is possible to inhibit a normal printer 20 from being associated with an IC card 41 that needs to be replaced. Because of the association, the user can replace either the printer 20 or the IC card 41 and perform the initial introduction again, without the need to contact the vendor's inquiry counter to ask about the IC card 41, or the like. Thus, a new printing service that is highly convenient for users can be realized.

In the printer 20 of this application, the printing operation is prohibited, but the charging process for the printable number of sheets is not prohibited. Therefore, the user can charge the printer 20, the server 30, and the like for the printable number of sheets before and during the initial introduction, thus increasing user convenience.

(2) The printer 20 transmits the results of the initial introduction to the server 30 (S43), and in S49, based on the determination result of the server 30 for the information transmitted in S43, determines whether the initial introduction has been normally completed. According to this, the server 30 can perform the process of determining the results of initial introduction, such as determining the ejection amount and image analysis of image data. Thus, the processing load of the printer 20 in the initial setup process can be reduced.

(3) The printer 20 determines whether the communication settings for the external communication interface 22 are received (S19), and when the communication settings are received (S19: YES), the printer 20 performs an initial introduction. According to this, the process of writing the printable number of sheets to the printer memory 27 and changing the activation information to the ON state can be executed after the initial introduction related to printing as well as the communication settings have been completed without fail.

(4) The printer 20 prepares the printing unit 23 ready for printing by filling the inkjet head 23C with ink as the initial introduction in S37. According to this, after confirming that printing by the printing unit 23 is ready, a process such as writing the printable number of sheets to the printer memory 27 can be performed.

(5) The printer 20 writes the printable number of sheets to the printer memory 27 in S53. Thereafter, the printer 20 executes the print operation within the printable number of sheets stored in the printer memory 27. According to this, the print operation can be performed using the printable number of sheets stored in the printer memory 27 provided to the printer 20. Even if the IC card 41 is removed or the server 30 is inaccessible, the printable number of sheets can be managed and printing can be performed.

(6) In S53, the printer 20 reads the printable number of sheets from the IC card 41 attached to the attachment interface 28 and stores the read printable number of sheets in the printer memory 27. According to this, the printer 20 can perform printing and other operations using the printable number of sheets stored in the printer memory 27. The IC card 41 does not need to be accessed each time the printable number of sheets is increased or decreased. Thus, the frequency of write and read processes to the IC card 41 can be reduced.

(7) The printer 20 transmits the results of the initial introduction to the server 30 (S43). The server 30 determines whether the initial introduction has been normally completed based on the results of the initial introduction received in S43 (S45) and transmits the results of the determination to the printer 20 (S47). The printer 20 determines in S49 whether the initial introduction has been normally completed based on the results of the determination received in S47. According to this, the server 30 can perform the process of determining the results of initial introduction, such as determining the ejection amount. The processing load of the printer 20 in the initial setup process can be reduced.

(8) The printer 20 is equipped with the ejection amount detector 23F that detects the ejection amount of ink in the printing unit 23 during printing operations. Then, the ejection amount detected by the ejection amount detector 23F when the printing unit 23 is operated (i.e., test operation, nozzle check, test printing, etc.) during the initial introduction is transmitted to the server 30 in S43. In S45, the server 30 determines that the initial introduction has been normally completed based on the fact that the received ejection amount is within a particular threshold range. According to this, the ejection amount of ink actually ejected by the printing operation of the printer 20 can be determined on the server 30 side. It is possible to detect abnormalities in ejection amount due to nozzle clogging, nozzle damage, and other causes.

(9) The printer 20 may transmit the image data generated by scanning the image of the printing sheet on which printing has been performed by the printing unit 23 to the server at S43. In S45, the server 30 may perform image analysis on the received image data and determine whether the initial introduction has been normally completed based on the results of the image analysis. According to this, it is possible to determine the images actually printed by the printer 20 printing operation on the server 30 side. It is possible to detect printing defects such as missing dots due to clogged nozzles.

(10) The server 30 has identification information data 33C that contains a plurality of device identification information 27C that can identify the printer 20. The printer 20 transmits the device identification information 27C of the printer 20 to the server 30 (S27). The server 30 determines whether the received device identification information 27C is stored in the identification information data 33C (S29), and if so, the server 30 transmits the determination result indicating that the device is a legitimate product to the printer 20 (S31). Based on the receipt of the determination result indicating that the printer 20 is a legitimate product (S35: YES), the printer 20 initiates the initial introduction. According to this, it is possible to perform the initial introduction or printing based on the printable number of sheets after checking whether the device identification information 27C is registered with the vendor, that is, whether the printer 20 is a legitimate printer or not. The use of illegitimate product printers can be suppressed.

(11) When receiving the communication settings in S19 (S19: YES), the printer 20 transmits the device identification information 27C to the server 30 in S27. According to this, the process of transmitting the device identification information 27C can be started in a state where the communication settings have been made and communication with the server 30 is enabled. This can suppress the occurrence of transmission failures of the device identification information 27C.

(12) After the printer 20 is turned on (S13), based on the fact that the IC card 41 is attached to the attachment interface (S15: YES), the printer 20 executes S17 and S19. According to this, the printer 20 receives the communication settings in a state where the IC card 41 is attached to the attachment interface 28 and the information on the IC card 41 is ready to be read. It is possible to suppress a situation where communication is enabled, but the IC card 41 cannot be read or is not yet attached.

(13) Multiple card IDs are stored in the identification information data 33C. The printer 20 transmits the card IDs of the IC card 41 attached to the printer 20 in S27. In S29, the server 30 determines whether the card ID, in addition to the device identification information 27C, is stored in the identification information data 33C. When both the device identification information 27C and the card ID are stored in the identification information data 33C (S29: YES), the server 30 transmits the determination result indicating that the product is legitimate in S31. According to this, it is possible to check whether the IC card 41 is duly sold or registered by the vendor as well as the printer 20. The use of illegitimate IC cards 41 can be inhibited.

Second Embodiment

Next, a second embodiment according to the present application will be described. In the first embodiment described above, as shown in FIG. 1, the printer 20 has an attachment interface 28 that reads the IC card 41, and the printer 20 reads the printable number of sheets stored on the IC card 41 and uses the same. In contrast, the printer 20 according to the second embodiment is configured to obtain the printable number of sheets from the server 30 and used the same. In the first embodiment, the printer operation panel 24 was used to inform the user of the print-enabled state (S55 in FIG. 4). In contrast, the second printer 20 performs the notification to the user via the portable terminal device 10. It is noted that, in the following description, description on components same as those in the first embodiment will be omitted as appropriate.

It is assumed that the portable terminal device 10 is set up to communicate with the printer 20 and the server 30 via the router 2. For example, when powered on, the portable terminal device 10 executes the terminal program 12A to start up the system. After the portable terminal device 10 starts up the system, the SSID, or the like, of the router 2 is input to the portable terminal device 10 in response to the operation input to the operation panel 14, thereby the portable terminal device 10 being communicable with the printer 20, or the like, via the router 2.

As shown in FIG. 7, the printer memory 27 stores the printable number of sheets 27D and the activation information 27E. The printable number of sheets 27D is the printable number of sheets obtained from the server 30, as will be described later. At the time the printer 20 is delivered from the vendor, for example, the printer 20 does not store the printable number of sheets in the printer memory 27, or the printable number of sheets indicating "zero" is stored in the printer memory 27. It is noted that, when the printer 20 is delivered from the vendor, a particular printable number of sheets 27D may be stored in the printer memory 27, or the user may charge the printable number of sheets 27D before the setup process described below.

When the printer 20 is delivered from the vendor, for example, the activation information is in the OFF state. Therefore, the printer 20 is in an initial state where printing operations cannot be executed. Further, unlike the first embodiment, the identification information data 33C of the server 30 has no card ID registered, and only the device identification information 27C of the legitimate printer 20 sold by the vendor is registered.

Initial Setup Process

Next, the initial setup process according to the second embodiment will be described. First, as in the first embodiment, the user, for example, purchases the printer 20 for the first time, and when the printer 20 arrives from the vendor, the user performs the setup process shown in FIG. 8. The portable terminal device 10, the printer 20, and the server 30 execute respective processes in response to the user's work. Further, the printer 20 executes processes shown in FIG. 9 and FIG. 10 in accordance with the initial setup process shown in FIG. 8.

As shown in FIG. 8, the user powers on the printer 20 (S13) and performs the setup of the network (S21). The printer 20 enables the network connection and is ready to communicate with the portable terminal device 10 and the server 30 (S17, S19, S23). Next, the printer 20 displays the access destination of its Web server on the printer operation panel 24 (S71). The printer 20 runs a program that functions as a web server, such as an Embedded Web Server (EWS) program, for example, on the printer CPU 26 to start up a web server. The printer 20 displays a particular URL of a web page published on the web server on the printer operation panel 24. The printer 20 may display the URL in text, or it may display the URL in a two-dimensional code such as a QR code (registered trademark of DENSO WAVE INCORPORATED). When the printer 20 can communicate with the portable terminal device 10, the printer 20 may notify the portable terminal device 10 of the URL to the application 12B.

The user may access the web server, for example, by operating the portable terminal device 10 and capturing an image of the QR code on the printer operation panel 24 with the camera 16 (S73). The portable terminal device 10 executes the process of registration for starting use of the printer 20 based on the operation input to the operation panel 14 (S75). For example, when there is access to the URL displayed in S71, the printer 20 displays a Web page on the portable terminal device 10 with a message such as "Would you like to start using the printer?" and a web page with a usage start button (not shown in the figures) that instructs the user to start using the printer 20.

After displaying the Web page, the printer 20 determines whether the usage start button of the Web Page is pressed (S77). The printer 20 keeps displaying the Web page until the usage start button is pressed (S77: NO). When the usage start button is pressed (S77: YES), the printer 20 transmits the device identification information 27C to the server 30 (S79). Therefore, unlike the first embodiment, after enabling the network connection (S23), the printer 20 according to the second embodiment performs transmission of the device identification information 27C in response to the instruction from the user to start using the printer 20. It is noted that, in the second embodiment, since the IC card 41 is not used, the card ID is not transmitted in S79.

The method of checking whether the access destination has been accessed is not necessarily limited to the method of determining whether the usage start button has been operated as described above. For example, a positive decision (S77: YES) may be made in S77 based on the fact that the URL displayed on the printer operation panel 24 has been accessed. In other words, the user's intention to use the system may be assumed to be satisfied only by accessing the URL by a browser, or the like, and processes from S79 onward may continue.

The server 30 determines whether the device identification information 27C received in S79 is registered in the identification information data 33C (S81) and transmits the result of the determination to the printer 20 (S31). When the printer 20 is determined by the server 30 to be a legitimate product (S35: YES in FIG. 9), the printer 20 performs an initial introduction (S37, S39, S41) and transmits the results of the initial introduction and the device identification information 27C to the server 30 (S83 in FIG. 10).

Similar to the first embodiment, the server 30 determines the results of the initial introduction (S45) and transmits the results of the determination to the printer 20 (S47). When the server 30 determines that the initial introduction has been normally completed (S45: YES), the server 30 notifies the printable number of sheets to the printer 20 (S85). For example, when the printer 20 is purchased, a particular printable number of sheets (e.g., 2000 sheets) is given as the initial charge and registered with the server 30. The server 30 transmits the printable number of sheets for this initial charge in S85. Alternatively, if the printable number of sheets has already been charged by the user, server 30 may transmit the printable number of sheets after charging the printer 20. For example, when receiving the determination result indicating the normal completion in S47, the printer 20 may display a screen for charging on the portable terminal device 10 and receive a charging instruction. The server 30 may transmit a value of "zero" as the printable number of sheets.

As shown in FIG. 10, when receiving the determination result of normal determination (S49: YES), the printer 20 determines whether the printable number of sheets has been received from the server 30 (S87). The printer 20 executes the determining process in S87 until (S87: NO) the printer receives the printable number of sheets from the server 30, and when the printer 20 receives the printable number of sheets from the server 30 (S87: YES), the printer 20 writes the printable number of sheets received from the server 30 into the printer memory 27 as the printable number of sheets 27D (S89). Next, the printer 20 changes the activation information 27E in the printer memory 27 from the OFF state to the ON state (S90). In this way, the printer 20 enters a print-enabled state in which the printer 20 can perform printing based on a print instruction, or the like, from the portable terminal device 10 within the range of the printable number of sheets 27D.

After executing S90, the printer 20 notifies the portable terminal device 10 that the printer 20 is in the print-enabled state (S91). The printer 20 may, for example, remain connected to the portable terminal device 10 for the session when the web page is accessed in S73 and S75, and perform the notification in S91. When, for example, the portable terminal device 10 is executing application 12B, the application 12B may perform periodic communications with the printer 20. Then, the printer 20 may notify the portable terminal device 10 that the printer 20 is in the print-enabled state in response to a communication from the application 12B. The portable terminal device 10 may, for example, display text such as "online" or "printable" on the display screen provided by the application 12B in a part where the printer name of the printer 20, or the like, is displayed, or the portable terminal device 10 may display a message such as "Printer of which name is XXX is now ready to print." In this way, the user of the portable terminal device 10 can recognize that the printer 20 has moved from the initial state to the print-enabled state by viewing the display on the portable terminal device 10. The user can operate the application 12B to transmit a print instruction to the printer 20 and have the printer 20 execute printing.

It is noted that, when an abnormal completion is determined (see item (3) above), the printer 20 notifies the portable terminal device 10 of the possibility of malfunctioning of the printer 20 (FIG. 10, S49: NO, S93), and performs a notification to the user. When the printer 20 is determined to be an illegitimate product (see item (4) above), the printer 20 notifies the portable terminal device 10 of the fact that the printer 20 is an illegitimate product (S35: NO, S95 in FIG. 9) and executes the notification to the user. In this way, the user does not need to look directly at the printer operation panel 24 of the printer 20, but can find out the result of the initial setup process for the printer 20 on the portable terminal device 10.

In the above second embodiment, the portable terminal device 10 is an example of an information processing device. S89 and S90 are examples of a shifting process. S71 is an example of an access destination notification process. S77 is an example of an access determining process. S79 is an example of a third transmitting process.

(Effect) According to the second embodiment described above, the effects same as those of the first embodiment are achieved. Further, the second embodiment achieves the following effects.

(1) The printer 20 according to the second embodiment is configured to store the printable number of sheets obtained from the server 30 in the printer memory 27 in S89. According to this, the printing process and the like can be performed based on the printable number of sheets stored in the printer memory 27, and it becomes unnecessary to access the server 30 every time the printable number of sheets is increased or decreased. Therefore, the frequency of communications with the server 30 can be reduced.

(2) When the printer 20 receives the communication setting in S19 (S19: YES), the printer 20 provides notification of an accessing destination (e.g., a Web server) of the printer 20 which can be externally accessed via the external communication interface 22 (S71). The printer 20 determines whether the notified access destination is accessed by the portable terminal device 10 (S77). When the access destination is accessed (S77: YES), the printer transmits the device identification information 27C to the server 30 in S79. According to this, the user's usage intent can be found based on whether the printer 20 is accessed by the portable terminal device 10. When the printer 20 is accessed by the user and the user's usage intent is confirmed, it becomes possible to proceed the process of determination of the legitimate product and the like by transmitting the device identification information 27C.

Modifications

The concrete examples according to the present invention have been described in detail, but they are only examples and do not necessarily limit the scope of the claims. The technology described in the claims includes various variations and modifications of the above-described concrete examples. Such modifications of each of the above embodiments are listed below.

In each of the above embodiments, the printable number of sheets is stored in the IC card 41 or the printer memory 27, and the printable number of sheets is decreased at each printing to determine whether further printing is possible. Alternatively, the printable number of sheets may be managed using the number that increases with printing, such as the number of printed sheets printed by the printer 20.

As the information processing device according to the present application, the portable terminal device 10, which is a smartphone, is employed, but the information processing device is not necessarily limited to the portable terminal device 10. As information processing devices, desktop PCs, notebook PCs, tablet PCs, and other terminals can be employed.

The activation information is not necessarily limited to information indicating whether the printing operation is restricted, but can also be information indicating, for example, whether the printable number of sheets is allowed to be written to the printer memory 27. For example, in the first embodiment described above, when the activation information is OFF, writing the printable number of sheets stored in the IC card 41 to the printer memory 27 is restricted. In a case of the second embodiment, when the activation information is OFF, the process of writing the printable number of sheets obtained from the server 30 to the printer memory 27 or obtaining the printable number of sheets from the server 30 is restricted. Then, when the initial introduction is completed, the activation may be turned ON and the printer may shift to a state where the printable number of sheets can be written to the printer memory 27. That is, the printable number of sheets may be written to the printer memory 27 after the activation information is turned ON.

Therefore, in each of the above embodiments, in S53 and S54 of FIG. 4, and in S89 and S90 of FIG. 8 (the shifting process of this application), the activation information is turned ON after the printable number of sheets is written to the printer memory 27. However, as the shifting process of the present application, the process of writing the printable number of sheets (S53 or S89) may be executed after the process of turning the activation information ON (S54 or S90) is executed.

Alternatively, as the shifting process of the present application, the process of changing the activation information to the ON state in S54 and S90 need not be executed. For example, the printer 20 and the server 30 can be configured not to use the activation information, and the printer 20 can shift to the print-enabled state by simply writing the printable number of sheets in the printer memory 27.

In the case where the printer 20 performs the determination of legitimate products or initial introduction in the printer 20, the printer 20 may handle the entire initial setup process, while only the registration to the management DB 33B (S57) may be executed with the server 30. That is, except for S57, the printer 20 may not communicate with the server 30. If the printing system 1 is a system that does not use the management DB 33B, the printing system 1 does not need to have the server 30.

In addition, a print instruction or charge for the printable number of sheets may be performed from any of multiple portable terminal devices 10 to a single printer 20.

The printer 20 may be configured to allow the user to refill ink (each ink tank in the ink reservoir 23A can be replaced). Other means for refilling consumables such as ink include a configuration that allows the ink or other consumables to be injected into the ink reservoir 23A from a bottle containing the ink or other consumables.

Although the inkjet printer 20 is used as the recording device in this application, a laser or thermal printer may also be used. The recording device is not necessarily limited to printers for individual users, but can also be commercial or industrial printers. Thus, the recording device may be a multifunctional peripheral equipped with scanning, copying, and faxing functions in addition to the printing function. The recording device may be a laser marker that uses a laser to mark a metal member or other object. Accordingly, the recording medium of this application is not limited to printing sheets, but can also be a metallic material, or the like.

The recording device in this application can also be a facsimile machine. Thus, the printing system 1 may be a facsimile system that limits the number of pages transmitted or received by facsimile according to the permitted number of pages stored in the IC card 41.

The printer 20 is configured to perform the initial introduction when the IC card 41 is attached for the first time, but the intimal introduction may be performed at other timings (e.g., every particular number of startups).

The printer 20 may not perform the initial introduction when the IC card 41 is installed, but may perform the initial introduction when the print instruction is received for the first time. The initial introduction in this application is a preparatory process for image formation. For example, in the case of the facsimile function, the initial introduction can be a preparatory process for implementing facsimile transmission or reception.

The printer 20 may store and manage the printable number of sheets 27D and the activation information 27E in a storage other than the memory in which the printer program 27A is stored, such as memory in the ink tank of the printing unit 23, a memory in the toner cartridge in the case of a laser printer, or memory for photosensitive drums.

The permitted recording number indicated by the recording permission information in this application is not necessarily limited to the printable number of sheets. For example, the permitted recording number may be the consumption of the ink or toner. The permitted recording number may be expressed in terms of how many dots (pixels) of ink are allowed to be dispensed or how much ink (e.g., how many milliliters) is allowed to be used. Alternatively, the permitted recording number may be specified by the number of rotations of the photosensitive drum or other components that rotate with the printing operation.

In each of the above embodiments, the server 30 may monitor the remaining ink amount in the printer 20 and notify the portable terminal device 10, and the like of the necessity of replacement of the printer 20 when the remaining ink amount falls below a particular amount. The server 30 may receive a charge for the printable number of sheets from the portable terminal device 10 and increase the printable number of sheets in the printer 20.

The server 30 does not need to receive user information or register the received user information in the management DB 33B.

If the IC card 41 is removed from the attachment interface 28 after the initial setup process is normally completed, the printer 20 may prohibit printing or may execute printing based on the printable number of sheets stored in the printer memory 27.

The method of obtaining the printer 20 is not limited. For example, a user may obtain the printer 20 from a real store, such as a retail store, or from a virtual store, such as an e-commerce site established on the "Internet 3."

What is claimed is:

1. A recording device, comprising:
   a recording unit configured to record on a recording medium; and
   a controller,
   wherein the controller is configured to perform:
   an initial introduction process of executing initial introduction to enable a recording operation by the recording unit in an initial state where the recording operation by the recording unit is not enabled, the initial introduction including a process of supplying a coloring agent to the recording unit;
   a transmitting process of transmitting a result of the initial introduction process to a server; and
   a completion determining process of determining whether the initial introduction is normally completed based on a response from the server with respect to the transmitting process; and
   a shifting process of allowing the recording device to shift from the initial state to a state where the recording operation by the recording unit is enabled within a permitted recording number of the recording operation by the recording unit in response to determining that the initial introduction is normally completed in the completion determining process.

2. The recording device according to claim 1,
   wherein the controller is configured to perform:
   a communication setting determining process of determining whether a communication setting is received; and
   the initial introduction process in response to determining that the communication setting is received in the communication setting determining process.

3. The recording device according to claim 1, further comprising a memory configured to store recording permission information related to the permitted recording number,
   wherein the controller is configured to perform:
   storing the recording permission information in the memory in the shifting process, and
   a recording process of recording, by the recording unit, within the permitted recording number indicated by the recording permission information stored in the memory after performing the shifting process.

4. The recording device according to claim 3, further comprising a reading unit configured to read information from an external storage medium,
   wherein, in the shifting process, the controller is configured to read the recording permission information from the external storage medium attached to the reading unit and store the read recording permission information in the memory.

5. The recording device according to claim 3, further comprising a communication interface configured to communicate with the server,
   wherein, in the shifting process, the controller is configured to store the recording permission information obtained from the server in the memory.

6. A recording system comprising:
a recording device; and
a server configured to communicate with the recording device,
wherein the recording device includes a recording unit configured to record on a recording medium, and
wherein the recording system is configured to allow the recording device to perform:
an initial introduction process of executing initial introduction to enable a recording operation by the recording unit in an initial state where the recording operation by the recording unit is not enabled, the initial introduction including a process of supplying a coloring agent to the recording unit;
a first transmitting process of transmitting a result of the initial introduction process to the server; and
a completion determining process of determining whether the initial introduction is normally completed based on a response from the server with respect to the first transmitting process; and
a shifting process of shifting a state of the recording device from the initial state to a state where the recording operation by the recording unit is enabled within a permitted recording number of the recording operation by the recording unit in response to determining that the initial introduction is normally completed in the completion determining process.

7. The recording system according to claim 6,
wherein the server is configured to perform:
a result determining process of determining whether the initial introduction is normally completed based on the result of the initial introduction process transmitted in the first transmitting process; and
a second transmitting process of transmitting a determination result of the result determining process to the recording device, and
wherein, in the completion determining process, the recording device is configured to determine whether the initial introduction is normally completed based on the determination result transmitted in the second transmitting process.

8. The recording system according to claim 7,
wherein the recording unit is a printing unit configured to print on a printing medium with using the coloring agent, and
wherein the recording device includes a consumption sensor configured to detect a consumed amount of the coloring agent in a printing operation by the printing unit,
wherein, in the first transmitting process, the recording device is configured to transmit the consumed amount detected by the consumption sensor when the initial introduction is executed, and
wherein the server is configured to determine whether the initial introduction is normally completed based on the consumed amount received from the recording device.

9. The recording system according to claim 7,
wherein the recording unit is a printing unit configured to print on a printing medium with using the coloring agent, and
wherein, in the first transmitting process, the recording device is configured to transmit image data of a read image of the printing medium on which printing is performed by the printing unit,
wherein, in the result determining process, the server is configured to perform image analysis on the image data received from the recording device and determine whether the initial introduction is normally completed based on a result of the image analysis.

10. A recording system comprising,
a recording device; and
a server configured to communicate with the recording device,
wherein the recording device includes a recording unit configured to record on a recording medium, and
wherein the recording system is configured to allow the recording device to perform:
an initial introduction process of executing initial introduction to enable a recording operation by the recording unit in an initial state where the recording operation by the recording unit is not enabled;
a completion determining process of determining whether the initial introduction is normally completed; and
a shifting process of shifting a state of the recording device from the initial state to a state where the recording operation by the recording unit is enabled within a permitted recording number of the recording operation by the recording unit in response to determining that the initial introduction is normally completed in the completion determining process,
wherein the server stores identification information data including a plurality of recording device identification information pieces which identify different recording devices, respectively,
wherein the recording device is configured to perform a third transmitting process of transmitting a recording device identification information piece of the recording device to the server,
wherein the server is configured to perform:
a registration determining process of determining whether the recording device identification information piece transmitted by the third transmitting process is included in the identification information data; and
in response to determining that the recording device identification information piece is included in the identification information data in the registration determining process, a fourth transmitting process of transmitting, to the recording device, a determination result of the registration determining process, and
wherein the recording device is configured to start the initial introduction process in response to receiving the determination result, which is transmitted by the fourth transmitting process, indicating that the recording device identification information piece is included in the identification information data.

11. The recording system according to claim 10, further comprising a communication interface configured to communicate with a server,
wherein the recording device is configured to perform:
a communication setting determining process of determining whether a communication setting of the communication interface is received; and
the third transmitting process in response to determining, in the communication setting determining process, that the communication setting of the communication interface is received.

12. The recording system according to claim 11, further comprising a reading unit configured to read information from an external storage medium,
wherein the recording device is configured to perform the communication setting determining process in response to the external storage medium being attached to the reading unit after the recording device is powered on.

13. The recording system according to claim 12,
wherein the external storage medium is configured to store a medium identification information piece identifying the external storage medium,
wherein the identification information data includes a plurality of the medium identification information pieces,
wherein, in the third transmitting process, the recording device is configured to transmit the medium identification information piece of the external storage medium attached to the recording device,
wherein the server is configured to perform:
in the registration determining process, determining whether the recording device identification information piece and the medium identification information piece transmitted by the third transmitting process are included in the identification information data; and
in response to determining that both the recording device identification information piece and the medium identification information piece are included in the identification information data in the registration determining process, transmitting, in the fourth transmitting process, a determination result of the registration determining process.

14. The recording system according to claim 11,
wherein the recording device is configured to perform:
communicating with an information processing device through the communication interface;
an access destination notification process of providing notification of an access destination of the recording device through the communication interface in response to determining that the communication setting is received;
an access determining process of determining whether the access destination notified by the access destination notification process is accessed from the information processing device; and
the third transmitting process in response to determining, in the access determining process, that the access destination is accessed.

* * * * *